(12) United States Patent
Leube et al.

(10) Patent No.: US 6,403,727 B1
(45) Date of Patent: Jun. 11, 2002

(54) METHOD FOR SELECTIVE HYDROGENATION OF ETHYLENE UNSATURATED DOUBLE BONDS IN POLYMERIZATES

(75) Inventors: Hartmann F. Leube, Ludwigshafen; Jürgen Schmidt-Thümmes, Neuhofen; Edgar Zeller, Mannheim; Heiko Maas, Schifferstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,614

(22) PCT Filed: Nov. 30, 1998

(86) PCT No.: PCT/EP98/07715

§ 371 (c)(1),
(2), (4) Date: Jun. 1, 2000

(87) PCT Pub. No.: WO99/28357

PCT Pub. Date: Jun. 10, 1999

(30) Foreign Application Priority Data

Dec. 1, 1997 (DE) .......................... 197 53 302

(51) Int. Cl.[7] .................................. C08F 8/04
(52) U.S. Cl. ................ 525/338; 524/555; 524/556; 524/565; 524/572; 524/574; 524/575; 524/575.5; 525/332.8; 525/333.4; 525/333.1; 525/333.2; 525/339
(58) Field of Search ................. 525/338, 339; 524/555, 556, 565, 572, 574, 575, 575.5

(56) References Cited

U.S. PATENT DOCUMENTS 3,898,208 A 8/1975 Krause
3,993,855 A * 11/1976 Kang .................... 525/338
4,452,950 A 6/1984 Wideman
5,208,296 A 5/1993 Rempel
5,244,965 A * 9/1993 Osman et al. ............. 525/338
5,258,467 A 11/1993 Rempel
5,561,197 A * 10/1996 Rempel et al. ............. 525/338

FOREIGN PATENT DOCUMENTS

| EP | 0 061 337 A | 9/1982 |
| EP | 0 240 697 | 10/1987 |
| GB | 2 070 023 | 9/1981 |
| WO | WO 92 17512 | 11/1993 |

OTHER PUBLICATIONS

Singha et al, "A New Method to Hydrogenate Nitrile Rubber in the Latex Form", Rubber Chemistry and Technology, 68, No. 2, May/Jun., 06, 1995.*

* cited by examiner

Primary Examiner—Bernard Lipman
(74) Attorney, Agent, or Firm—Oblon, Spivak, McClelland, Maier & Neustadt, P.C.

(57) ABSTRACT

A process for selectively hydrogenating ethylenically unsaturated double bonds in polymers P involves reacting the polymers P with hydrogen in the presence of at least one hydrogenation catalyst selected from the salts and complex compounds of rhodium and/or of ruthenium in an aqueous dispersion of the polymers P that comprises not more than 20% by volume of an organic solvent. This process can be used to give hydrogenated polymer dispersions and, from these dispersions, polymers. Also claimed are aqueous polymer dispersions comprising polymers P', which include structural units I, II and III as in claim 10, with or without structural units IV and/or V as in claim 11.

15 Claims, No Drawings

METHOD FOR SELECTIVE HYDROGENATION OF ETHYLENE UNSATURATED DOUBLE BONDS IN POLYMERIZATES

The present invention relates to a process for selectively hydrogenating ethylenically unsaturated double bonds in addition polymers by reacting the polymers with hydrogen in the presence of at least one hydrogenation catalyst selected from salts and complex compounds of rhodium and/or of ruthenium.

The hydrogenation of ethylenically unsaturated double bonds is an important method of derivatizing polymers containing such bonds. A range of polymers of this kind are produced on the industrial scale, examples being butadiene- and/or isoprene-based polymers. The ethylenically unsaturated double bonds in these polymers are starting points for the aging processes as may occur under the action of light, oxygen and/or heat. Depending on the degree of exposure, such aging processes often entail a dramatic deterioration in the mechanical properties of the polymers and/or the articles produced from the polymers, and are also the cause of instances of very obvious and disruptive discoloration. By hydrogenating the double bonds it is intended to remove such weak points. Furthermore, hydrogenation makes it possible in principle to provide classes of polymer which are new or which can otherwise be prepared only by a very much more complex method.

In developing hydrogenation processes for polymers a fundamental consideration is that the polymer hydrogenation substrates may include not only the ethylenically unsaturated double bonds but also other hydrogenation-reactive functionalities. A feature of the hydrogenation process must therefore be, in general, a high level of selectivity toward the target double bonds. Further, an intrinsic risk of hydrogenation is that there may be generated on the polymer reactive intermediates which have the capacity to react with remaining double bonds and so cause crosslinking.

Techniques for hydrogenating polymers that contain ethylenically unsaturated double bonds are fundamentally known. An overview of such techniques is given by N. T. McManus et al. (J. Macromol. Sci., Rev. Macromol. Chem. Phys. (C 35(2), 1995, 239–285). A common feature of all of the techniques described is that the reaction is conducted in an organic medium. This includes the homogeneous reaction of the dissolved polymer in the presence of a homogeneously dissolved catalyst in an organic solvent, and heterogeneous reactions of polymers in suspension in an organic solvent in the presence of homogeneously dissolved catalysts, and also the hydrogenation of polymer solutions and/or polymer melts in the presence of heterogeneous catalysts. However, gelling is generally observed in the course of the hydrogenation, which points to crosslinking reactions.

EP-A 588 097 discloses the hydrogenation of polymers based on butadiene/acrylonitrile. In these processes the polymers are reacted in the form of aqueous dispersions in at least five times the amount, based on the dispersion, of an organic solvent and in the presence of ruthenium catalysts. Special additives are added to suppress the formation of crosslinked polymers. A disadvantage of this process is the large quantities of solvent that are employed.

Fundamentally there is great interest in the transfer of the catalytic hydrogenation of polymers containing ethylenically unsaturated double bonds to aqueous reaction systems. For instance, some industrially important butadiene polymers are available commercially as aqueous polymer dispersions. Furthermore, the use of solvents in the course of production is a not insignificant cost factor. Solvent avoidance also appears desirable on the grounds of workplace safety and environmental protection.

It is an object of the present invention to provide a process for selectively hydrogenating ethylenically unsaturated double bonds in polymers which firstly operates without the use of large amounts of solvent and secondly ensures high selectivity of the hydrogenation reaction of the ethylenic double bond over the hydrogenation of other functionalities and over crosslinking reactions.

We have found that this object can be achieved, surprisingly, by a process in which the polymers are hydrogenated in the presence of rhodium and/or ruthenium compounds or their salts, as hydrogenation catalysts, in an aqueous dispersion of the polymers that contains little if any organic solvent.

The present invention therefore provides a process for selectively hydrogenating ethylenically unsaturated double bonds in polymers P by reacting the polymers with hydrogen in the presence of at least one hydrogenation catalyst selected from the salts and complex compounds of rhodium and/or of ruthenium, which comprises conducting the hydrogenation in an aqueous dispersion of the polymers that comprises not more than 20% by volume of an organic solvent.

The hydrogenation of polymers in aqueous dispersion has to date been considered an impossibility. For successful hydrogenation it has been assumed that the polymers must be present in the dissolved or melted state, or at least in a swollen state, so that the catalytically active species can get to the reactive sites, in other words the ethylenically unsaturated double bonds in the polymers. In organic reaction media, hydrophobic polymers will naturally be present in dissolved or at least swollen form, but this is not the case in water or aqueous reaction systems. For this reason the hydrogenation of hydrophobic polymers, as already mentioned, has to date always been conducted in an organic medium or in the melted state.

This opinion is confirmed, inter alia, by B. Cornils, Angew. Chem. 107, 1995, 1709–1711. This reference states that catalytic reactions in two-phase systems where the substrate is the hydrophobic phase and the catalyst is in the aqueous phase come up against their limits when the starting materials, in this case the polymers, are of inadequate solubility in water and, consequently, when the transfer of organic substrate into the aqueous phase or to the interface is hindered. The ruthenium- and/or rhodium-comprising catalyst systems employed in accordance with the invention, on the other hand, appear able under the reaction conditions to penetrate at least partly into the polymer phase/water interface or to cross said interface.

In the process of the invention the hydrogenation catalysts or catalyst precursors that can be employed are all salts and/or complex compounds of ruthenium or of rhodium which are able under the respective reaction conditions— that is, hydrogen partial pressure, reaction temperature, reaction mixture pH, and any coligands present (or inorganic or organic compounds that act as coligands)—to form active hydrogenation species of low molecular mass. Examples of rhodium and ruthenium salts suited to this purpose are their hydrides, oxides, sulfides, nitrates, sulfates, halides, such as their chlorides, carboxylates, such as their acetates, propionates, hexanoates and benzoates, their salts with sulfonic acids, and mixed salts, ie. salts with different anions, such as the oxide chlorides. Also suitable are salts of complex ions of rhodium and/or ruthenium, examples being the salts of rhodium or ruthenium oxoacids, the salt of haloruthenates and halorhodates, especially the chlororuthenates and chlororhodates, the ammine and aqua complexes of rhodium halides and of ruthenium halides, especially the chlorides, and the salts of nitroruthenates. Examples of the above salts and complex salts are ruthenium(III) chloride, ruthenium(III) nitrosylchloride, ammonium pentachloroaquaruthenate(III), hexaammineruthenium(II) and -(III) chloride, dichlorobis(2,2'-bipyridyl)ruthenium(II), tris(2,2'-bipyridyl)ruthenium(II) chloride, pentaamminechlororuthenium(III) chloride, potassium pentachloronitrosylruthenium(II), ruthenium(IV) oxide, tetraacetatochlorodiruthenium(II,III), hexakisacetatotriaqua-μ-oxotriruthenium(III) acetate, rhodium(III) chloride, rhodium(III) hydroxide, rhodium(III) nitrate, rhodium(III) sulfate, ammonium pentachloroaquarhodate(III), potassium pentachlororhodate (III), sodium hexachlororhodate(III), triamminetrichlororhodium(III), trisethylenediaminerhodium(III) chloride, rhodium(II) acetate dimer, hexakisacetatotriaqua-μ-oxotrirhodium(III), rhodium(IV) oxide and potassium hexanitrorhodate(III). Neutral complexes of rhodium and of ruthenium are likewise suitable. It should be noted here that the transitions between salts of ruthenium or rhodium and the saltlike and neutral complexes are imprecise, and the subdivision made here is merely an aid to organization. Examples of neutral complexes include the 2,4-pentanedionates of rhodium and ruthenium, such as ruthenium(III) tris-2,4-pentanedionate, rhodium(I) dicarbonyl-2,4-pentanedionate, rhodium(III) tris-2,4-pentanedionate, bisethylenerhodium(I) 2,4-pentanedionate and norbornadienerhodium(I) 2,4-pentanedionate, and the carbonyl complexes of ruthenium and rhodium, such as dodecacarbonyltetrarhodium, hexadecacarbonylrhodium, tetracarbonyldi-μ-chlorodirhodium(I) and dodecacarbonyltriruthenium.

Also suitable are ruthenium complexes of the formula

Ru X$^1$X$^2$(CO)$_k$(L$^1$)$_l$(L$^2$)$_2$ with organophosphorus compounds, where X$^1$ and X$^2$ independently are hydrogen, halogen, preferably chloride, the anion of a carboxylic acid, such as acetate, benzoate or hexanoate, or of a sulfonic acid, such as phenolsulfonate, acetylacetonate or substituted or unsubstituted phenyl, k and l independently are 0, 1 or 2 with the proviso that k+l=1 or 2, L$^1$ is selected from carbonyl, pyridine, benzonitrile, dibenzophosphol, cycloolefins and a ligand of the formula PR$_3$, in which R is alkyl, alkyloxy, cycloalkyl, cycloalkyloxy, aryl, preferably phenyl, which can be unsubstituted or substituted, or aryloxy, and L$^2$ is PR$_3$ and (L$^2$)$_2$ can also be R$_2$P—A—PR$_2$ in which R is as defined above and A is alkylene or arylene.

In this context alkyl is either linear or branched alkyl of preferably 1 to 12 and especially 1 to 4 carbons, such as methyl, ethyl, n-propyl, isopropyl, n-butyl, 2-butyl, isobutyl, tert-butyl, n-hexyl, 2-ethylhexyl and n-decyl. Alkoxy is generally C$_1$–C$_{12}$-alkoxy and preferably C$_1$–C$_4$-alkoxy, such as methoxy, ethoxy, n-propoxy, isopropoxy, n-butoxy, 2-butyloxy, tert-butoxy, n-hexyloxy and 2-ethylhexyloxy. The alkyl may also carry hydroxyl or amino functions or can be substituted by one or more nonadjacent oxygens or imino groups. Examples of such radicals are 2-hydroxyethyl, hydroxypropyl, 2-aminoethyl, and 5-hydroxy-3-oxapentyl.

Aryl is, for example, phenyl or naphthyl, each of which may carry one or more substituents. Suitable substituents are halogen, such as chloro, alkyl, especially C$_1$–C$_4$-alkyl, alkoxy, especially C$_1$–C$_4$-alkoxy, and hydroxyl, which can also be in ethoxylated form. Preferred aryls are phenyl, o-, m- or p-tolyl, p-chlorophenyl, p-tert-butylphenyl and p-hydroxyphenyl, which can also be in ethoxylated form (with a degree of ethoxylation (EO degree) of 1 to 50). Alkylene is preferably 1,2-ethylene or 1,2- or 1,3-propylene, each of which may be substituted and/or may be part of a carbocycle or heterocycle. Arylene embraces, in particular, o-phenylene, o,o-diphenylene and (o o-diphenylene) methane.

Examples of ligands PR$_3$ are triphenylphosphine, triisopropylphosphine, tris-n-butylphosphine, tris-n-octylphosphine, tricyclohexylphosphine, trisanisylphosphine, tris(p-tolyl)phosphine, triethyl phosphite and tri-n-butyl phosphite.

Further suitable hydrogenation catalysts are rhodium phosphine complexes of the formula Rh X$_m$L$^3$L$^4$(L$^5$)$_n$ where X is halide, preferably chloride or bromide, the anion of a carboxylic acid, acetylacetonate, aryl- or alkylsulfonate, hydride or the diphenyltriazine anion, L$^3$, L$^4$ and L$^5$ independently are CO, olefins, cycloolefins, dibenzophosphol, benzonitrile, PR$_3$ or R$_2$P—A—PR$_2$, m is 1 or 2 and n is 0, 1 or 2, with the proviso that at least one of L$^3$, L$^4$ and L$^5$ is one of the abovementioned phosphorus-containing ligands of the formula PR$_3$ or R$_2$P—A—PR$_2$.

X is preferably hydride, chloride, bromide, acetate, tosylate, acetylacetonate or the diphenyltriazine anion, especially hydride, chloride or acetate.

Example of suitable phosphine complexes of ruthenium or rhodium are carbonylchlorohydridobis (tricyclohexylphosphine)ruthenium(II), carbonylchlorohydridobis(triisopropylphosphine)ruthenium (II), carbonylchlorohydridobis(triphenylphosphine) ruthenium(II), carbonylchlorostyrylbis (tricyclohexylphosphine)ruthenium(II), carbonylchlorostyrylbis(triisopropylphosphine)ruthenium (II), carbonylchlorobenzoatobis(triphenylphosphine) ruthenium(II), dichlorotris(triphenylphosphine)ruthenium (II), bis(triphenylphosphine)rutheniumdicarbonyl chloride, acetatohydridotris(triphenylphosphine)ruthenium(II), chlorotris(triphenylphosphine)rhodium(I), hydridotetrakis (triphenylphosphine)rhodium(I), hydridotris (dibenzophosphol)rhodium(I).

The hydrogenation activity of the abovementioned ruthenium and rhodium salts and of the complex compounds can in principle be increased by adding phosphorus-containing compounds having the capability to form at least one co-ordinative bond between the phosphorus-and the transition metal. Examples of suitable phosphorus-containing compounds are the abovementioned compounds of the formula PR$_3$ and R$_2$P—A—PR$_2$, and also trifluorophosphine, dibenzophosphol, etc. Such compounds can also be modified by giving them further atoms or groups suitable for co-ordination with the metal atom, such as amino or imino groups, examples being oxazoline and imidazoline groups. The probable explanation for the action of such phosphorus-containing compounds is that they promote the formation of active hydrogenation species from the individual ruthenium or rhodium precursor employed. Preferred phosphorus-containing compounds are the abovementioned compounds of the formula $PR_3$ or $R_2P$—A—$PR_2$.

In a preferred embodiment of the present invention the hydrogenation catalysts employed are salts and/or complex compounds of ruthenium. They are employed preferably together with the abovementioned phosphorus-containing compounds, especially with compounds of the formula $PR_3$ and/or $R_2P$—A—$PR_2$. In this case the phosphorus-containing compounds are selected in particular from triisophosphine, tri-n-butylphosphine, tris-n-octylphosphine, tricyclohexylphosphine, triphenylphosphine, trisanisylphosphine and tris(p-tolyl)phosphine.

In a specific embodiment of the present process a catalyst system is employed which comprises at least one of the abovementioned pentanedionates of ruthenium, especially ruthenium(III) tris-2,4-pentanedionate, and at least one compound of the formula $PR_3$ and/or $R_2P$—A—$PR_2$, especially triisopropylphosphine, tri-n-butylphosphine, tricyclohexylphosphine and/or triphenylphosphine.

The molar ratio of phosphorus-containing compound to metal atom is generally within the range from 1:2 to 40:1, preferably from 1:1 to 20:1 and, in the case of a combination of a ruthenium pentanedionate with a phosphorus-containing compound, is in the range from 1:2 to 20:1, preferably from 2:1 to 10:1. Before being deployed in the hydrogenation reaction such catalyst systems are preferably prepared by mixing together the components, with or without heating at from 50 to 150° C., for example, in an appropriate solvent and, if desired, under a hydrogen pressure of from 1 to 20 bar, for example. Suitable solvents are exemplified by aromatic hydrocarbons, such as benzene, toluene, xylenes, chlorobenzene, anisole, cumene, ethers, such as diethyl ether, tetrahydrofuran, dioxane, amides, such as dimethylformamide, N-methylpyrrolidone, dimethyl sulfoxide, alcohols, such as methanol, ethanol, n-propanol, isopropanol, n-butanol, tert-butanol or ketones, such as acetone or methyl ethyl ketone.

Suitable substrates for the hydrogenation process of the invention are in principle all aqueous dispersions of polymers having ethylenically unsaturated double bonds. These include both dispersions prepared by free-radical polymerization of aqueous monomer emulsions (primary dispersions) and those whose polymers are prepared by another route and are then converted to an aqueous dispersion form (secondary dispersions). The term polymer dispersion also embraces, in principle, dispersions of microcapsules.

Suitable polymers P containing ethylenically unsaturated double bonds are homo- or copolymers of conjugated dienes comprising generally from 10 to 100% by weight of at least one conjugated diene as monomer (a). Examples of suitable diene monomers (a) include butadiene, isoprene, chloroprene, 1-methylbutadiene, 2,3-dimethylbutadiene, 2-(tri-$C_1$–$C_4$-alkyl)silylbutadiene, such as 2-triethylsilyl-1, 3-butadiene, and mixtures thereof. Preferred monomers (a) are butadiene and isoprene, especially butadiene.

In a preferred embodiment the process of the invention is used to hydrogenate polymers P which are built up from at least one conjugated diene as monomer (a) and from at least one further monomer, (b), which is copolymerizable with the diene. Copolymers of this kind are generally composed of from 10 to 99% by weight, in particular from 20 to 95% by weight of monomer(s) (a) and from 1 to 90% by weight, preferably from 5 to 80% by weight of monomer(s) (b).

Examples of suitable monomers (b) are olefins, such as ethylene, propylene, vinylaromatic monomers, such as styrene, α-methyl styrene, o-chlorostyrene or vinyltoluenes, vinyl esters of aliphatic or branched $C_1$–$C_{18}$ monocarboxylic acids, such as vinyl acetate, propionate, butyrate, valerate, hexanoate, 2-ethylhexanoate, decanoate, laurate and stearate, esters of preferably $C_3$–$C_6$ ethylenically unsaturated mono- and dicarboxylic acids, such as especially acrylic, methacrylic, maleic, fumaric and itaconic acid, with generally $C_1$–$C_{12}$-, preferably $C_1$–$C_8$-, and, in particular, $C_1$–$C_4$-alkanols, such as methanol, ethanol, n-propanol, isopropanol, 1-butanol, 2-butanol, isobutanol, tert-butanol, n-hexanol, 2-ethylhexanol, or $C_5$–$C_{10}$-cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, 2-ethylhexyl acrylate and tert-butyl acrylate. Further suitable monomers (b) are ethylenically unsaturated nitriles such as acrylonitrile or methacrylonitrile; preferred monomers (b) are styrene, α-methylstyrene and acrylonitrile.

In addition to the monomers (a) and (b) the polymers P to be hydrogenated may also comprise modifying monomers (c) in copolymerized form. The polymers P can generally contain up to 20% by weight, based on the overall weight of the monomers (a), (b) and (c), of such copolymerized, modifying monomers (c). The modifying monomers (c) include monomers (c'), which are of increased solubility in water (for example, >60 g/l at 25° C. and 1 bar). The monomers (c') include, for example, the abovementioned ethylenically unsaturated carboxylic acids, especially acrylic, methacrylic, maleic and itaconic acid, the amides of the abovementioned ethylenically unsaturated carboxylic acids, such as acrylamide and methacrylamide, the N-alkylolamides of the abovementioned ethylenically unsaturated carboxylic acids, such as N-methylolacrylamide and N-methylolmethacrylamide, the hydroxyalkyl esters of the abovementioned ethylenically unsaturated carboxylic acids, such as 2-hydroxyethyl acrylate and methacrylate, ethylenically unsaturated sulfonic acids and their alkali metal salts, such as vinylsulfonic acid, allylsulfonic acid, methallylsulfonic acid and acrylamido-2-methylpropanesulfonic acid, and also N-vinyllactams, such as N-vinylpyrrolidone or N-vinylcaprolactam, for example. Such monomers (c') are generally employed in a minority, in other words <20% by weight, based on the overall amount of the monomers (a), (b) and (c) that are to be polymerized, preferably ≦10% by weight and, for example, in amounts of up to 0.1 to 10% by weight and especially 0.5 to 8% by weight.

The monomers (c) also include monomers (c"), which have at least two nonconjugated, ethylenically unsaturated bonds—examples are the diesters of dihydric alcohols with ethylenically unsaturated monocarboxylic acids. Examples of these are alkylene glycoldiacrylates and dimethacrylates, such as ethylene glycol di(meth)acrylate, 1,3-butylene glycol di(meth)acrylate, 1,4-butylene glycol di(meth)acrylate, propylene glycol di(meth)acrylate, and also divinylbenzene, vinyl methacrylate, vinyl acrylate, allyl methacrylate, allyl acrylate, diallyl maleate, diallyl fumarate, diallyl phthalate, methylenebisacrylamide, cyclopentadienyl acrylate and methacrylate, tricyclodecenyl acrylate and methacrylate, N,N'-divinylimidazolin-2-one and triallyl cyanurate. Such monomers are employed, if desired, in amounts of from 0.01 to 10% by weight, based on the overall amount of the monomers (a)+(b)+(c).

The advantages of the process of the invention are manifested in particular in connection with the hydrogenation of polymer dispersions comprising copolymerized monomers (b) and/or (c) which carry functional groups that are amenable, in principle, to hydrogenation. Such monomers include, in particular, those having carbonyl, nitrile and/or aryl groups, such as phenyl groups, which can be unsubstituted or substituted.

Preferred embodiments of the process of the invention relate to the hydrogenation of polymer dispersions whose polymers P are built up essentially from butadiene and/or isoprene, especially butadiene as sole monomer (a), and from styrene, acrylonitrile, methacrylonitrile, isobutene and/or alkyl (meth)acrylates as monomer(s) (b).

Preferred monomer combinations (a)/(b) are butadiene and/or isoprene with styrene and/or α-methylstyrene, butadiene with acrylonitrile and/or methacrylonitrile, butadiene and isoprene with acrylonitrile and/or methacrylonitrile, butadiene with acrylonitrile and styrene; butadiene with isobutene; and butadiene with alkyl (meth)acrylates.

One specific embodiment of the present invention relates to the hydrogenation of polymer dispersions whose polymers P are composed essentially of from 20 to 95% by weight of monomers (a) selected from butadiene and isoprene and from 5 to 80% by weight of monomers (b) selected from styrene, α-methylstyrene and acrylonitrile, the proportions of the monomers (a) and (b) adding up to 100% by weight. It is also possible for such polymers to contain copolymerized, modifying monomers (c) in the abovementioned amounts, preferably in amounts of up to 10% by weight based on the overall amount of the monomers (a), (b) and (c). Preferred monomers (c) are acrylic, methacrylic and itaconic acid, acrylamide, methacrylamide, N-methylolacrylamide and/or N-methylolmethacrylamide.

The preparation of such polymers P is known to the skilled worker and can in principle be carried out by anionic, free-radical or Ziegler-Natta polymerization in solution, in bulk, in suspension or in emulsion. Depending on the type of reaction, the conjugated dienes are 1,4- and/or 1,2-polymerized. For the hydrogenation process of the invention it is preferred to employ polymers prepared by free-radical aqueous emulsion polymerization of the above monomers (a) and, if used, (b) and/or (c) (including mini- and microemulsion polymerization). These techniques are sufficiently well known to the skilled worker and are described at length in the literature, for example in Ullmann's Encyclopedia of Industrial Chemistry, 5th Ed., Vol. A 21., pp. 373–393. In general, such polymers are prepared in the presence of free-radical initiators and, if desired, surface-active substances such as emulsifiers and protective colloids (see, for example, Houben-Weyl, Methoden der organischen Chemie, Vol. XIV/1, Makromolekulare Stoffe, [Macromolecular substances], Georg Thieme-Verlag, Stuttgart 1961, pp. 192–208).

Suitable free-radical polymerization initiators include organic peroxides, such as tert-butyl hydroperoxide, benzoyl hydroperoxide, diisopropylbenzoyl peroxide, inorganic peroxides, such as hydrogen peroxide, salts of peroxomono- and/or peroxodisulfuric acid, especially the ammonium and/or alkali metal peroxodisulfates (persulfates), and azo compounds, particular preference being given to the persulfates. Preference is also given to combined systems composed of at least one organic reducing agent and at least one peroxide and/or hydroperoxide, such as tert-butyl hydroperoxide and the sodium salt of hydroxymethanesulfonic acid, or hydrogen peroxide and ascorbic acid (as an electrolyte-free redox initiator system), and to combine systems which additionally comprise a small amount of a metal compound which is soluble in the polymerization medium and whose metallic component can exist in a plurality of valence states, for example ascorbic acid/iron(II) sulfate/hydrogen peroxide, it also being possible frequently to replace the ascorbic acid by the sodium salt of hydroxymethanesulfinic acid, sodium sulfite, sodium hydrogensulfite or sodium bisulfite and the hydrogen peroxide by tert-butyl hydroperoxide, alkali metal peroxodisulfates and/or ammonium peroxodisulfate. Instead of a water-soluble iron(II) salt it is also possible to employ a combination of water-soluble Fe/V salts.

These polymerization initiators are employed in customary amounts, such as in amounts of from 0.01 to 5, preferably from 0.1 to 2.0% by weight, based on the monomers to be polymerized.

The monomer mixture can if desired be polymerized in the presence of customary regulators, such as mercaptans, an example of which is tert-dodecyl mercaptan. These regulators are then used in an amount of from 0.01 to 5% by weight, based on the overall amount of the mixture.

There are no particular restrictions on the emulsifiers that can be used. Preference is given to neutral emulsifiers such as ethoxylated mono-, di- and trialkylphenols (EO degree: 3 to 50, alkyl: $C_4$ to $C_9$) or ethoxylated fatty alcohols (EO degree: 3 to 50, alkyl: $C_8$ to $C_{36}$) and/or anionic emulsifiers, such as the alkali metal and ammonium salts of fatty acids (alkyl: $C_{12}$ to $C_{24}$), alkyl sulfates (alkyl: $C_8$ to $C_{22}$), of sulfuric monoesters of ethoxylated alkanols (EO degree: 4 to 30, alkyl: $C_8$ to $C_{22}$) and of ethoxylated alkylphenols (EO degree: 3 to 50, alkyl: $C_4$ to $C_{10}$), of alkylsulfonic acids (alkyl: $C_8$ to $C_{22}$) and of alkylarylsulfonic acids (alkyl: $C_4$ to $C_{18}$). Further suitable anionic emulsifiers are alkali metal or ammonium salts of mono- or di-$C_4$–$C_{24}$-alkyl derivatives of bis(phenylsulfonic acid) ether, such as technical-grade mixtures comprising from 50 to 80% of the monoalkylated product. Such emulsifiers are known from U.S. Pat. No. 4,269,749; the technical-grade mixtures are obtainable, for example, commercially under the designation Dowfax®2A1 (Dow Chemical).

Particular preference is given to the alkali metal and/or ammonium salts, especially the sodium salts, of alkylarylsulfonic acids, alkylsulfonic acids (eg. sulfonated $C_{12}$–$C_{18}$ paraffin; on the market as Emulgator K 30 from Bayer AG), alkylsulfates (eg. sodium lauryl sulfonate, on the market as Texapon®K12 from Henkel) and of the sulfuric monoesters of ethoxylated alkanols (eg. sulfoxylated ethoxylate of lauryl alcohol with 2 to 3 EO units; on the market as Texapon®NSO from Henkel KGaA). Further suitable emulsifiers are the sodium or potassium salts of fatty acids ($C_{12}$–$C_{23}$-alkyl radicals), such as potassium oleate. Additional appropriate emulsifiers are given in Houben-Weyl, loc. cit., pp. 192–208. Instead of or in a mixture with emulsifiers it is also possible, however, to employ conventional protective colloids, such as polyvinyl alcohol, polyvinylpyrrolidone or amphiphilic block polymers with short hydrophobic blocks, for the purpose of co-stabilization. In general the amount of emulsifiers used, based on the monomers to be polymerized, will not exceed 5% by weight.

The free-radical polymerization reaction can be carried out by the whole-batch initial charge (batch) technique, but is preferably operated, especially on the industrial scale, in accordance with the feed technique. In this latter technique the major amount (generally from 50 to 100% by weight) of the monomers to be polymerized are added to the polymerization vessel in accordance with the progress of the polymerization of the monomers already in the polymerization vessel. In this context; the free-radical initiator system can be either included entirely in the initial charge to the polymerization vessel or else added continuously or in stages to the polymerization reaction at the rate at which it is consumed in the course of the free-radical aqueous emulsion polymerization. In each individual case this will depend, as is known, both on the chemical nature of the initiator system and on the polymerization temperature. The initiator system is preferably supplied to the polymerization zone at the rate at which it is consumed.

The polymerization reaction is preferably conducted in the presence of an aqueous polymer dispersion as polymer (seed latex). Such techniques are fundamentally known to the skilled worker and are described, for example, in DE-A 42 13 967, DE-A 42 13 968, EP-A 567 811, EP-A 567 812 or EP-A 567 819, which are incorporated fully herein by reference. In principle it is possible, depending on the desired character, to include the seed in the initial charge or to add it continuously or in stages in the course of polymerization. The polymerization is preferably carried out with the seed in the initial charge. The amount of seed polymer is preferably in the range from 0.05 to 5% by weight, preferably from 0.1 to 2% by weight and, in particular, from 0.2 to 1% by weight, based on the monomers a) to d). The polymer particles of the seed latex that is used preferably have weight-average diameters in the range from 10 to 100 nm, preferably from 20 to 60 nm and, in particular, about 30 nm. Preference is given to the use of a polystyrene seed.

The polymerization reaction is preferably carried out under superatmospheric pressure. The period of polymerization can vary within a wide range, and is generally from 1 to 15 hours, preferably from 3 to 10 hours. The temperature of polymerization is also variable within a wide range and, depending on the initiator used, is from about 0 to 110° C.

The polymer dispersions prepared in this way generally have solids contents of up to 75% by weight. Particular importance is attached to polymer dispersions having solids contents of from 40 to 70% by weight. For use in the hydrogenation process of the invention it is possible to employ the dispersions with these solids contents. In some cases, however, the dispersions have to be diluted to an appropriate solids content beforehand. The solids content of the dispersion employed is preferably in the range from 10 to 60% by weight, in particular from 20 to 50% by weight, based on the overall weight of the dispersion.

The surface-active substances still present, in general, in the polymer dispersions, and further substances used, for example, as customary polymerization auxiliaries in emulsion polymerizations, do not have a disruptive effect on the hydrogenation process of the invention. However, it is advisable to subject the polymer dispersions to chemical or physical deodorization before hydrogenation. Physical deodorization, by stripping the residual monomers with steam, is known, for example, from EP-A 584 458. EP-A 327 006 for its part recommends the use of conventional distillation methods. Chemical deodorization takes place preferably by means of a postpolymerization following the main polymerization. Such processes are described, for example, in DE-A 383 4734, EP-A 379 892, EP-A 327 006, DE-A 44 19 518, DE-A 44 35 422 and DE-A 44 35 423.

The hydrogenation of the invention is generally conducted in such a way that one of the abovementioned catalysts or catalyst precursors together, if desired, with one or more coligands, such as the abovementioned phosphorus-containing compounds, as they are or dissolved in an organic solvent, are added to the polymer dispersion. If desired, the dispersion is adjusted to an appropriate solids content by diluting it with water or a water/emulsifier mixture or with a water-miscible organic solvent. Then the desired hydrogen pressure is established and the batch is heated to an appropriate reaction temperature. In this context one possible procedure, for example, is first, after adding the catalyst to the dispersion, to establish a relatively low hydrogen overpressure, then to heat the reaction batch to the desired reaction temperature and then to establish the hydrogen overpressure required for the reaction. It is often judicious to flush the reaction vessel beforehand with an inert gas such as nitrogen, for example.

Suitable solvents for dilution include, in particular, the abovementioned $C_1$–$C_4$-alkanols, ketones such as acetone and ethyl methyl ketone, cyclic ethers such as tetrahydrofuran or dioxane, or amides such as N,N-dimethylformamide or N-methylpyrrolidone. The solvent content of the polymer dispersion that is to be hydrogenated, however, will generally not exceed 20% by weight based on the overall weight of the dispersion. The aqueous polymer dispersion, where necessary, is diluted preferably only with water or with a water/emulsifier mixture.

However, it is found judicious in many cases—and especially when using coligands such as the abovementioned phosphorus-containing compounds—to combine the particular desired ruthenium and/or rhodium compound in an appropriate solvent with the coligand (see above) and to add the resulting solution or suspension to the polymer dispersion. If desired, this solution or suspension, before being added to the polymer dispersion, is reacted with hydrogen or with another reducing agent, for example with hydrogen, at pressures in the range from 1 to 20 bar and at from 50 to 150° C., in the course of which reaction the catalytically active species is formed. Activation may also take place in situ, in other words in the polymer dispersion.

Hydrogenation also takes place in general at a hydrogen partial pressure of from 0.5 to 600 bar, preferably from 50 to 400 bar and, in particular, from 100 to 300 bar. The reaction temperature is generally from 20 to 250° C., preferably from 50 to 200° C., and, in particular, from 100 to 180° C. Depending on the nature of the catalyst system and on the desired conversion the amounts of catalyst employed are in the range of from 1 to 1000 ppm ruthenium and/or rhodium, based on the overall weight of the polymer dispersion to be hydrogenated, preferably from 5 to 500 ppm. The reaction period is generally from 1 to 30 hours, preferably from 2 to 25 hours and, in particular, from 3 to 20 hours.

Depending on the desired character of the hydrogenated polymer the reaction can be conducted up to a certain degree of conversion, which can be established in a conventional manner by choosing the reaction parameters, such as hydrogen pressure, temperature and the nature and amount of the catalyst system employed. The degree of conversion can be determined, for example, by IR spectrometry, by monitoring the bands typical of ethylenically unsaturated double bonds in the range from 900 to 1000 $cm^{-1}$.

The polymer dispersions hydrogenated by processes of the invention are notable for the fact that the ethylenic double bonds of the polymers P present therein have been hydrogenated selectively, even in the presence of other hydrogenation-active double bonds, such as aromatic C—C double bonds, carbonyl groups, nitrile functions, etc.

The polymer dispersions thus obtainable are novel and are likewise provided with the present invention. The polymers obtainable therefrom, which are obtained in a known manner from the dispersions (see below) and are likewise provided by the present invention, are notable for a high—and in comparison with the nonhydrogenated base dispersions markedly improved—stability with respect to environmental effects such as light, oxygen and/or elevated temperature. This predestines the polymers of the invention for use in exterior applications, for example as binders for emulsion paints and other coating compositions and as finishes for textiles, leather and paper.

A particularly preferred embodiment of the present invention relates to the hydrogenation of aqueous dispersions of styrene-butadiene polymers. Polymer dispersions comprising copolymerized butadiene and styrene are preferably prepared by free-radical emulsion polymerization and are important industrial products. In many respects they can be compared with polymers based on styrene/butyl acrylate, with the copolymerized butadiene taking over the role of the "softening" butyl acrylate. Although butadiene possesses a considerable cost advantage over butyl acrylate, in that the former can be separated directly from the $C_4$ cut from the steam cracker whereas the latter has to be prepared in at least two steps starting from steam cracker products, butadiene-containing polymers are, on the other hand, hampered by the abovementioned disadvantages in respect of their weathering stability, so that their possible applications have to date been greatly limited.

The hydrogenation process of the invention surprisingly leads, in the case of the above polymers based on butadiene/styrene, to polymers P' which in terms of their mechanical properties are at least comparable with, if not superior to, the nonhydrogenated polymers and which have a markedly lower sensitivity to environmental conditions. Both the hydrogenated polymer dispersions and the polymers P' present therein are novel and are likewise provided by the present invention. The polymers P' can be obtained from the aqueous dispersions in a known manner by removing the water and any solvents present, by precipitation and filtration, for example, or by drying, such as spray drying or freeze drying, or in evaporative extruders.

The polymers P' hydrogenated in accordance with the invention that are obtainable starting from polymers P based on styrene and/or α-methylstyrene as monomers (a) and on butadiene and/or isoprene as monomers (b) are composed essentially of structural units I, II and III

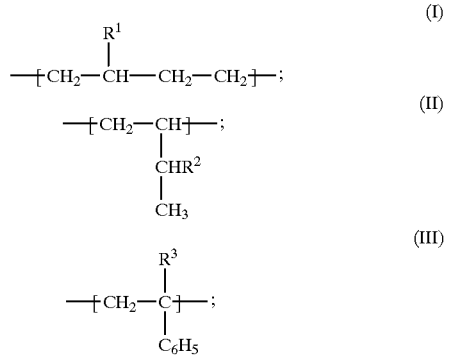

where $R^1$, $R^2$ and $R^3$ independently are hydrogen or methyl.

$R^1$ and $R^2$ are preferably hydrogen. In general, such polymers P' contain from 55 to 98 mol-% of structural units I and II and from 2 to 45 mol-% of structural units III, based in each case on the overall molar number of the structural units I, II and III.

Such polymers P' may additionally include structural units IV

where X is selected from hydrogen, COOH and $CH_2$—COOH, Y from COOH, $CONH_2$, CONH—$CH_2OH$ and Z from hydrogen, $CH_3$ and, if X=H, from $CH_2COOH$ as well. In addition, if Z=H or methyl, X and Y can also be a group —C(O)—O—C(O)— and C(O)—N(R)—C(O), in which R is hydrogen, $C_1$–$C_6$-alkyl or aryl. Structural units IV result from the modifying monomers (c) in the polymers P of the starting dispersions. The molar proportion of the structural unit IV is preferably in the range from 0.05 to 10 mol-%, based on the overall molar number of the structural units I, II and III.

The polymers P' may also feature structural units V

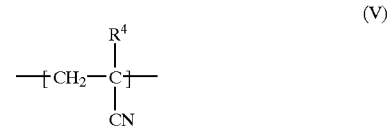

where $R^4$ is hydrogen or methyl, preferably hydrogen. Structural units V result from copolymerized acrylonitrile or methacrylonitrile in the polymers P of the initial dispersions. The proportion of structural units V can be up to 40 mol-%, based on the overall molar number of the structural units I, II and III, and is for example from 0.5 to 35 mol-%.

The hydrogenated polymers P' are notable for high resistance to environmental influences; for example, a low propensity to yellowing and embrittlement. In addition, the polymers P' feature an improved tear strength relative to the nonhydrogenated polymers P and a heightened elongation at break. An unwanted buildup in molecular weight caused by crosslinking in the course of hydrogenation has not been observed, and nor has the hydrogenation of the phenyl groups in such polymers.

The polymers P' and their dispersions can be employed, for example, as binders for sealing or coating compositions; for example, in emulsion paints, in polymer-modified plasters, especially for exterior applications, and also as pressure-sensitive adhesives and as an elastomeric component in molding compounds.

EXAMPLES

I. Starting Dispersions D1 and D2

Dispersion D1: A monomer emulsion comprising 28 kg of butadiene, 9.2 kg of styrene and 8.0 kg of aqueous potassium oleate (17.4% strength by weight) in 45 kg of water was polymerized at 10° C. with 38.4 g of diisopropylbenzyl hydroperoxide and 37 g of dodecyl mercaptan to a degree of conversion of 80%. The residual monomer content was subsequently reduced by means of combined chemical and physical deodorization to <10 ppm of butadiene and 400 ppm of styrene (determined by means of gas chromatography of the serum).

Dispersion D2: A polymerization vessel was charged with 5 kg of water and seed latex (polystyrene seed, 30 nm) and this initial charge was heated to 75° C. 6 g of sodium persulfate and 5% by weight of the monomer emulsion were added. Subsequently, while maintaining the temperature, 2280 g of a 5% strength by weight aqueous sodium persulfate solution and the remaining amount of the monomer emulsion were metered in over the course of 3 h, beginning at the same time and via separate feeds, and in the course of these additions the pressure did not exceed 6 bar. Then polymerization was continued for one hour while maintaining the temperature. The content of residual monomers was subsequently reduced to values <10 ppm by means of combined chemical and physical deodorization.

The monomer emulsion consisted of
- 14,250 g of a monomer mixture of butadiene and styrene in a weight ratio of 1:2,1,
- 750 g of acrylic acid,
- 105 g of Texapon®NSO (Henkel KGaA) and
- 7400 g of water.

II. Hydrogenated Dispersions (Examples 1 to 6)

a) Preparing the Catalyst Solution

An autoclave with a volume of 0.3 l was charged under argon with 100 g of toluene, 5.0 g of ruthenium(III) tris-2,4-pentanedionate and 10.15 g of tris-n-butylphosphine. Then 5 bar of hydrogen pressure were applied to the autoclave at room temperature, the contents were heated to 100° C., and the hydrogen pressure was raised to 10 bar. The hydrogen pressure and temperature were maintained for 2 h, before the reaction mixture was cooled and transferred to an inert storage vessel.

b) Hydrogenation Processes of the Invention

Example 1

Under inert gas conditions, 45.4 g of the catalyst solution prepared in IIa were added with thorough mixing to 1 kg of the dispersion D1 from I. This mixture was transferred to an autoclave with a volume of 2.5 l, which had been rendered inert beforehand by repeated evacuation and filling with nitrogen. Then 10 bar of hydrogen were applied to the autoclave at room temperature, the contents were heated to 110° C., and then the hydrogen pressure was raised to 50 bar. The hydrogen pressure and temperature were maintained for 15 h. After cooling, the resulting dispersion was analyzed. The results are compiled in Table 1.

Example 2

Hydrogenation was carried out as in Example 1 but using 18.1 kg of catalyst solution to 1 kg of dispersion D1.

Example 3

Hydrogenation was carried out as in Example 2 except that now the reaction temperature was 150° C. and the hydrogen pressure 100 bar.

Example 4

Hydrogenation was carried out as in Example 3 but in the presence of 4.5 g of catalyst solution.

Example 5

Under inert gas conditions, a mixture of 0.09 g of the catalyst solution prepared in IIa and 0.09 g of toluene were added with thorough mixing to a mixture of 50 g of the dispersion D2 from I and 50 g of water. This mixture was transferred to an autoclave with a capacity of 300 ml, which had been rendered inert. Then 10 bar of hydrogen were applied to the autoclave at room temperature, the contents were heated to 150° C., and then the hydrogen pressure was raised to 100 bar. The pressure and temperature were maintained for 15 h. After cooling to room temperature, the resulting dispersion was analyzed without further treatment. The results are compiled in Table 1.

Example 6

Hydrogenation was carried out as in Example 5. The catalyst was employed in the form of a mixture of 0.045 g of the catalyst solution from IIa and 0.135 g of toluene. During the reaction the hydrogen pressure was 280 bar. The analytical data for the dispersion are compiled in Table 1.

TABLE 1

|  | $Ru^{1)}$ [ppm] | $T_g^{2)}$ [° C.] | $I/I_o^{3)}$ 960 $cm^{-1}$ | $I/I_o^{3)}$ 910 $cm^{-1}$ |
|---|---|---|---|---|
| D1 | 0 | −55 | 1.00 | 1.00 |
| Example 1* | 500 | −46 | 1.00 | 0.46 |
| Example 2* | 200 | −47 | 0.95 | 0.05 |
| Example 3* | 200 | n.d. | <0.05 | <0.05 |
| Example 4* | 50 | −54 | <0.85 | <0.60 |
| D2 | 0 | 32 | 1.00 | 1.00 |
| Example 5* | 10 | 32 | <0.05 | <0.05 |
| Example 6* | 5 | 32 | 0.15 | <0.05 |

*in accordance with the invention
$^{1)}$ruthenium employed based on the total amount of the dispersion employed
$^{2)}$determined by DSC (differential scanning calorimetry) and evaluated by the midpoint method in accordance with ASTM D 3418-82
$^{3)}$ratio between standardized intensities of IR bands for hydrogenated samples (I) and nonhydrogenated samples ($I_o$). The IR band at 960 $cm^{-1}$ results from the double bond of a 1,4-linked butadiene unit and the band at 910 $cm^{-1}$ from the double bond of a 1,2-linked butadiene unit. The intensities were standardized by integrating the respective band and comparing the resulting peak area with the peak area of the band at 699 $cm^{-1}$ (styrene unit).

III. Determining the Performance Properties

The dispersion D1 from I and the dispersion from Example 1 were conventionally cast to give films and dried. Sample specimens were prepared from the dried films, with a length of 20 mm and a width of 4 mm. The thickness of the samples was from about 500 to 600 μm.

The samples prepared in this way were subjected to a stress/strain measurement in accordance with DIN 53455-3 using a conventional tensile testing machine. The rate of take-off was 100 mm/min and the sample temperature 23° C. The results are compiled in Table 2.

TABLE 2

|  | $Ru^{1)}$ [ppm] | Tear strength$^{2)}$ [N/mm$^2$] | Elongation at break$^{2)}$ [%] |
|---|---|---|---|
| Dispersion D1 | 0 | 1.14 | 315 |
| Example 1$^{3)}$ | 500 | 3.90 | 1646 |

$^{1)}$see Table 1
$^{2)}$determined on polymer films in accordance with DIN 53455
$^{3)}$in accordance with the invention

We claim:

1. A process for selectively hydrogenating ethylenically unsaturated double bonds in polymers P by reacting the polymers with hydrogen in the presence of at least one hydrogenation catalyst selected from the group consisting of salts and complex compounds of ruthenium, which comprises conducting the hydrogenation in an aqueous dispersion of the polymers P that comprises not more than 20% by volume of an organic solvent at a temperature of from >100 to 250° C. and a hydrogen partial pressure of from 50 to 600 bar.

2. A process as claimed in claim 1, wherein the hydrogenation catalyst comprises at least one salt and/or one complex compound of ruthenium and at least one phosphorus-containing compound which is able to form a co-ordinative bond with the ruthenium.

3. A process as claimed in claim 2, wherein the phosphorus-containing compound is selected from the group consisting of compounds of the formulae $PR_3$ and $R_2P-A-PR_2$, in which the radicals R can be identical or different and independently of one another can be alkyl, cycloalkyl, aryl, alkoxy, cycloalkoxy, aryloxy or fluorine and A is a bivalent hydrocarbon radical.

4. A process as claimed in claim 1, wherein from 1 to 1000 ppm ruthenium, based on the overall weight of the dispersion, are employed.

5. A process as claimed in claim 1, wherein the dispersion comprises polymers P which are built up essentially from at least one conjugated diene as monomer (a) and from at least one monomer, (b), which is copolymerizable with the diene, and, if desired, from a modifying monomer (c).

6. A process as claimed in claim 5, wherein the polymers P are composed essentially of from 20 to 95% by weight of monomers (a) selected from butadiene and isoprene, and from 5 to 80% by weight of monomers (b) selected from the group consisting of styrene, α-methylstyrene and acrylonitrile, the proportion of the monomers (a) and (b) adding up to 100% by weight.

7. A process as claimed in claim 5, wherein the polymers P contain up to 20% by weight, based on the overall amount of monomers (a), (b) and (c), of modifying monomers (c) in copolymerized form.

8. An aqueous polymer dispersion obtained by a process as claimed in claim 1, said polymer dispersion comprising polymers P' which are composed essentially of structural units I, II and III:

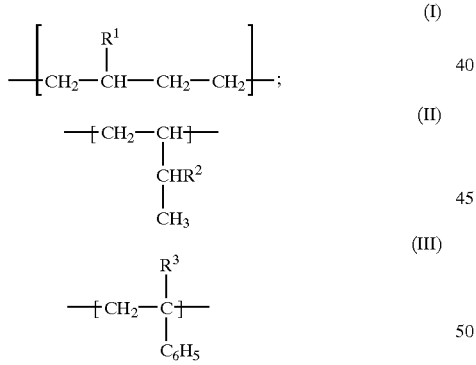

wherein $R^1$, $R^2$ and $R^3$ independently are hydrogen or methyl, said polymer dispersion containing less than 20% by volume of an organic solvent.

9. An aqueous polymer dispersion as claimed in claim 8, wherein the polymers P' additionally comprise structural units IV and/or V:

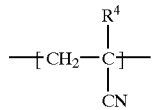

wherein

X is selected from the group consisting of hydrogen, COOH and $CH_2-COOH$,

Y is selected from the group consisting of COOH, $CONH_2$ and $CONHCH_2OH$,

Z is selected from the group consisting of hydrogen and $CH_3$ and, if X=H can also be $CH_2COOH$, or X and Y are $-C(O)-O-C(O)-$ or $-C(O)-NR-C(O)-$ in which R is hydrogen, $C_1-C_6$-alkyl or aryl, if Z=H or methyl, and $R^4$ in formula V is hydrogen or methyl.

10. A process for selectively hydrogenating ethylenically unsaturated double bonds in a polymer P, said process comprising, reacting said polymer with hydrogen in the presence of at least one hydrogenation catalyst, said hydrogenation catalyst comprising at least one salt or complex compound of ruthenium and at least one phosphorus containing compound of formula $PR'_3$ or $R^2{}_2P-A-PR^3{}_2$, wherein $R^1$, $R^2$ and $R^3$ may be identical or different and represent an alkyl, cycloalkyl, aryl, alkoxy, cycloalkoxy, aryloxy, or a fluorine atom, and A is a bivalent hydrocarbon radical, and wherein said process is conducted in an aqueous dispersion of said polymer P, said aqueous dispersion comprising not more than 20% by volume of an organic solvent at a temperature of from greater than 100 to 250° C. and a hydrogen partial pressure of from 50 to 600 bar.

11. The process as claimed in claim 10, wherein from 1 to 1000 ppm ruthenium, based on the total weight of the dispersion, is present.

12. The process as claimed in claim 10, wherein the dispersion comprises at least one polymer P, said polymer P produced from at least one conjugated diene monomer (a) and from at least one monomer (b), said monomer (b) copolymerizabe with said monomer (a), and optionally a modifying monomer (c).

13. The process as claimed in claim 10, wherein the polymer P consists essentially of from 20 to 95% by weight of monomer (a) selected from butadiene and isoprene, and from 5 to 80% by weight of monomer (b) selected from the group consisting of styrene, α-methylstyrene and acrylonitrile, the proportion of said monomers (a) and (b) adding up to 100% by weight.

14. The process as claimed in claim 10, wherein the polymer P comprises up to 20% by weight of modifying monomer (c) in copolymerized form based on a total amount of monomers (a), (b) and (c).

15. An aqueous polymer dispersion obtained by the process as claimed in claim 10, said polymer dispersion comprising at least one polymer P', said polymer P' consisting essentially of structural units I, II and III:

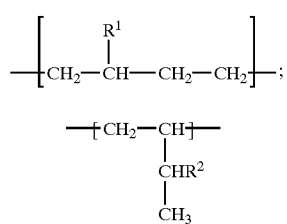 (I)
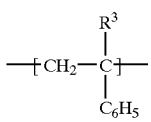 (III)
(II)
wherein $R^1$, $R^2$ and $R^3$ independently are hydrogen or methyl, said polymer dispersion containing less than 20% by volume of an organic solvent.
* * * * *